March 27, 1928.
C. M. JAMIESON
1,663,987
APPARATUS FOR COATING ARTICLES
Original Filed Feb. 14, 1922
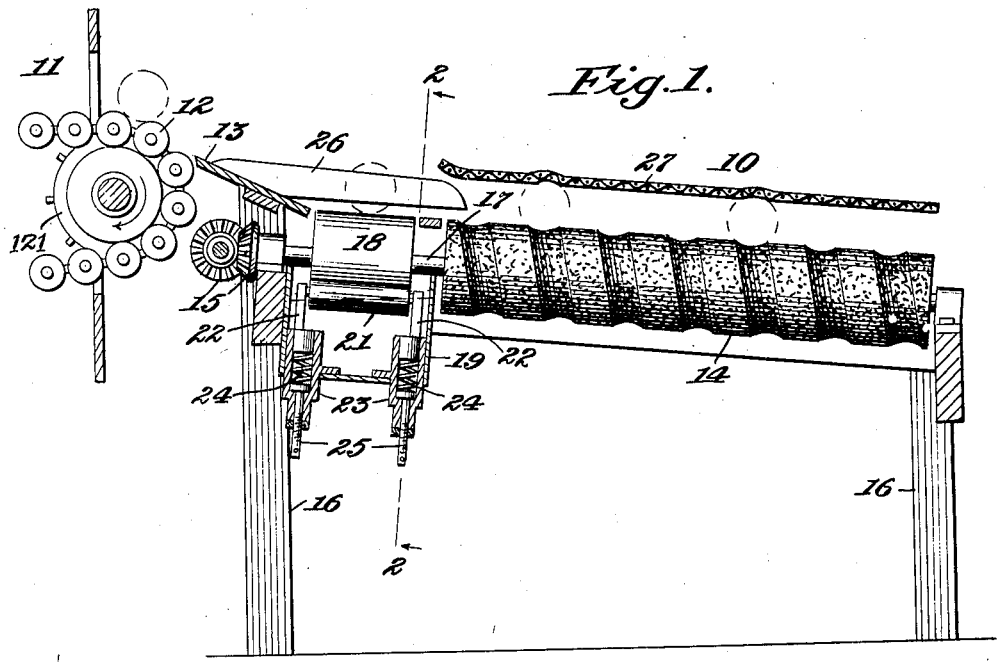
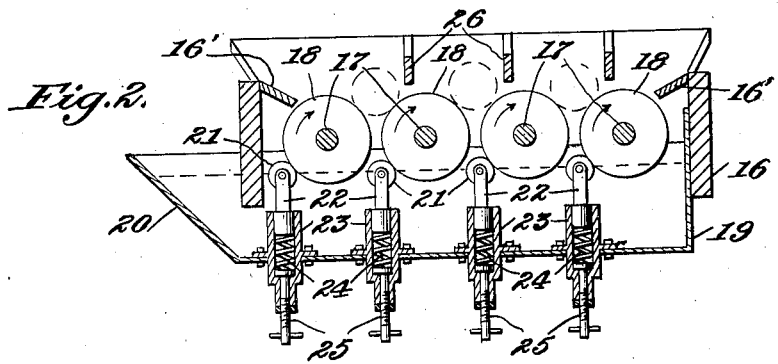
Inventor:
Charles M. Jamieson
by Seward & McKay
his Attys.

Patented Mar. 27, 1928.

1,663,987

UNITED STATES PATENT OFFICE.

CHARLES MURDOCK JAMIESON, OF WINTER HAVEN, FLORIDA, ASSIGNOR, BY MESNE ASSIGNMENTS, TO BROGDEX COMPANY, OF WINTER HAVEN, FLORIDA, A CORPORATION OF FLORIDA.

APPARATUS FOR COATING ARTICLES.

Application filed February 14, 1922, Serial No. 536,553. Renewed August 20, 1927.

This invention relates to apparatus for applying to articles a non-solid material and forming from the applied material a thin continuous and smooth coating covering the article.

The general object of the invention is the provision of simple and efficient mechanically operating means to initially apply a fluid, semi-fluid or pasty coating and preservative composition in substantially uniform quantities over a substantial portion of the surface of the article to be coated, in combination with means for subsequently brushing or rubbing the article to produce a thin continuous and uniform coating over its entire surface. The apparatus of the invention is useful in the preparation for market of fresh fruit upon which it is desirable to form a coating from such a composition, to insure the fruit reaching the consumer in sound and salable condition. The apparatus is especially useful for the treatment of oranges, grapefruit, and other citrus fruits which, as is well known, must be handled, packed and shipped with great care if they are to reach the consumer in good condition.

It has been discovered that by properly applying to citrus fruit a mixture of a sealing and waterproofing material, such as paraffin, with a readily volatile liquid vehicle, such as gasoline, the fruit may be provided with a very thin but continuous coating that protects it from rotting, prevents it from withering, and in general maintains its original appearance, soundness, freshness and flavor. The apparatus of the present invention enables this treatment to be carried out in a simple, economical and effective manner. Accordingly, in explaining the principles of the invention, reference will be made, for the sake of a concrete illustrative example, to novel apparatus particularly useful in treating citrus fruit on a large scale.

In one of its broad aspects, the novel apparatus comprises means of some description for brushing or otherwise rubbing the surface of the articles, and a roller device for applying the coating material engaging the articles in their feeding movement to the brushing or rubbing means. Another feature comprised in the novel apparatus is a plurality of devices for applying the coating material, engaging the article to be coated and so coating therewith as to cause contact of the coating material with the surface of the article to be coated simultaneously over a plurality of spaced areas of that surface and progressively in varying directions over that surface, resulting in a rapid application of the coating material.

The underlying principles of the invention can be readily understood from the description hereinafter of a typical embodiment in which said principles are incorporated in a form that not only works satisfactorily but has the further advantage of utilizing standard fruit handling machinery with only relatively slight alterations to confer upon it the novel capabilities here in question. It is to be understood, however, that the embodiment hereinafter described is merely illustrative of a typical construction included within the broad scope of the invention. Said illustrative embodiment is nevertheless the preferred form of the broad invention at present, and it embodies especially desirable and useful novel specific features of construction..

Such a typical embodiment is illustrated in the accompanying drawings, wherein:

Figure 1 is a side elevation, partly broken away and in section of one form the apparatus may take; and Figure 2 is a perpendicular transverse section thereof along the line 2—2 of Figure 1, looking in the direction of the arrows.

In the embodiment of the apparatus illustrated in the drawings, 10 designates generally a fruit brushing or rubbing device or machine of any suitable character, the particular device or mechanism here shown being what is known in the fruit packing industry as a polisher of the Stebler-Parker type. At 11 is indicated generally a fruit drier of a type commonly preceding the so-called polisher in the series of machinery constituting a usual type of packing house installation.

According to the practice prevailing heretofore, where a coating material was not to be applied to the fruit, oranges or other citrus fruits, previously washed in water, and then dried in a drier, such as indicated at 11, were passed without further treatment directly to a polisher, such as indicated at 10, from which they were discharged to the usual grading and sizing machinery. At 12 is indicated a usual type of endless conveyor, driven by suitable means such as sprocket 12¹, for feeding the fruit through the drier, and at 13 the usual form of sloping board, runway or chute, to continue a forward feeding movement of the fruit toward the polisher, the runway or chute board imparting a forward rolling movement to the fruit.

In the apparatus forming the subject matter of my present invention, means are provided for applying a non-solid or fluent coating material to the fruit, so that the polisher brushes or rolls can act to spread this coating material over the fruit in a thin smooth coating as the fruit travels over them, such coating material being, for example, a suitable mixture of paraffin and gasolene.

In the illustrative embodiment of the novel apparatus here shown, the coating material is initially applied to the fruit during its forward feeding movement from the drier to the brushing or rubbing device, specifically the polisher indicated. The mechanism for applying the coating material may be embodied in a self-contained unit independently driven and entirely separate structurally from the brushing or rubbing unit and from other apparatus such as the drier and the feeding runways constituting the series of customary packing house installation, and such unit may be assembled in the series between the drier and the polisher to perform the functions of supplying coating material to the fruit on its way to the polisher. In the illustrative embodiment of the apparatus, however, use is made of a portion of the framework of the polisher and of its driving mechanism to support and drive the devices for applying the coating material.

The polisher rolls shown in the illustrative embodiment of the apparatus comprise a plurality of parallel rolls 14 with spirally cut brush surfaces usually composed of horsehair bristles or the like, said rolls being arranged in a series horizontal transversely and inclined longitudinally downwardly from their receiving to their delivery ends, the arrangement being such as to feed the fruit from the receiving to the delivery end during the brushing action, the fruit traveling down the elongated runways formed by cooperation of the rolls in pairs, and contacting with the brush surfaces of each during the brushing operation. In the present example there are four polisher rolls providing three runways; but the runways may vary in number from one up to any desired maximum. The gears for rotating the polisher rolls are shown at 15. Said rolls are all driven in the same rotational direction.

The polisher rolls 14 are mounted in a frame 16 having side boards 16' obliquely inclined from the frame to a line closely adjacent the cylindrical surfaces of the two outside rolls and along their entire lengths.

Where, as in prior practice, mechanism for applying coating material to the fruit is not employed, or where, according to one form which the invention may assume, such mechanism is incorporated in a separate unit, the frame in which the brush rolls are mounted is made only of sufficient length to accommodate the polisher rolls proper. In the illustrative embodiment of the novel apparatus, however, the frame 16 is lengthened as shown and the axles 17 of the brush or polisher rolls are extended beyond the receiving ends of those rolls, and those extended axles and the gearing 15 are utilized as driving means for the mechanism for applying the coating material. In the illustrative form of the apparatus, the mechanism for applying the coating material comprise carrier or applying rolls 18 corresponding in number to the polisher rolls, having cylindrical surfaces and secured to the axles 17 to be driven thereby, in rotative movement in the same direction as, and in this instance, at the same speed of rotation as the brush rolls.

A suitable container is provided for the fluent coating material, such for example as the tank 19, rectangular in general contour, secured to the portions of the frame 16 in depending position with its bottom spaced immediately below the applying rolls 18, and of a length, extending transversely of the rolls, and a width, extending longitudinally of the rolls, sufficient to extend its sides upwardly to freely encompass the outer sides and ends of the series of applying rolls, all as shown in the drawings. A mouth or funnel portion 20 serves as a convenient means of filling the container with fluent material.

The applying rolls 18, shown in the illustrative embodiment of the apparatus in outline, may be solid rolls or may comprise hubs secured to the axles 17 with open frameworks or spokes extending therefrom to support their cylindrical surfaces. In either event, the cylindrical surfaces are imperforate and either composed of a material to which the fluent substance will adhere or covered with such a material; and iron, leather or canvas, among other materials, will serve the purpose.

In the illustrative embodiment of the apparatus here shown, the series of applying rolls 18 are inclined in the direction of their length at the angle of inclination of the brush rolls, and for convenience of attachment and location of parts cooperating with the applying rolls, the container for the fluent material is also correspondingly inclined, which presents the liquid level of the fluent material in the container at an angle to the bottom of the container and to the lowermost crowns of the applying rolls. The liquid level of the fluent material in the container is preferably maintained at a height to extend above the lowermost straight lines of the cylindrical surfaces of the applying rolls 18, as indicated in dotted line in Figure 1; so that the cylindrical surfaces of the applying rolls in their lowermost paths of travel are submerged in the fluent material although the submergence of the lowermost portion of the cylindrical surfaces of the rolls is slight at the point of highest inclination of these rolls, and increases to the point of lowest inclination. This particular arrangement is not material to the invention in its broader aspects, however.

Presser or wiper rolls 21 are provided, one for each of the applying rolls 18; as adjustable composition spreading and distributing means. Each presser or wiper roll is positioned to engage the cylindrical surface of an applying roll 18 in a part of that surface traveling away from the fluent material, and in a line of engagement parallel with the axis of the applying roll and above the liquid level of the fluent material in the container and hence above the highest line of contact of the fluent material with the cylindrical surface of the applying roll. Each presser or wiper roll 21 is journaled in a pair of arms 22, each of which arms is mounted for longitudinal sliding movement in a box 23 upon a spring 24, the tension of which is adjustable at will by the screw rod 25 having a head bearing upon the lower end of the spring in the box. By the arrangement of parts described, it is apparent that the presser or wiper rolls 22 contact with the applying rolls 18 with an adjustable yielding pressure and that the rolls 22 function not only to uniformly distribute the fluent coating material over the cylindrical surface of the applying rolls but to press or wipe off the excess of the coating material initially adhering to these rolls from their submergence in the fluent material in the container, the quantity of the coating material pressed or wiped off varying with the degree of pressure of the wiper rolls upon the cylindrical surfaces of the applying rolls. Hence the presser or wiper rolls 22 constitute means for controllably predetermining the quantity of fluent material delivered by the applying rolls 18 in their paths of movement above the level of the fluent material.

The applying rolls 18 are of such diameter as to be juxtaposed each with the succeeding one of the series on the axles 17 to provide runways for the pieces of fruit between any two adjacent rolls and to support the pieces of fruit upon the complementary surfaces of such adjacent rolls.

The sloping chute board 13 extends from a position to receive the fruit advanced by the conveyer 12 to a position closely adjacent the upper or receiving ends of the applying rolls 18, and the chute board imparts a forward rolling movement to the fruit advancing the same from the conveyer to the receiving ends of the applying rolls.

To assist in distributing the fruit to the runways between the applying rolls and ultimately to deliver the fruit directly to the runways between the brush rolls 14, which are the operative positions for the brushing or rubbing action on the fruit which distributes the adhering coating material thereover in a uniform and smooth coating, guides 26 are provided secured to the chute board 13 and extending slightly above and parallel to the applying rolls to positions projecting a short distance over the brush rolls, the guides extending in vertical planes closely adjacent the vertical median longitudinal planes of both sets of rolls referred to. The provision of these guides prevents the fruit being carried largely to one side of the apparatus by rotation of the applying rolls.

The articles of fruit delivered from the conveyer 12 are thus distributed upon the chute board 13 into groups between the guides 26 and are advanced by the chute board in forward rolling movements to its delivery end, and are thereby directed into the several runways into which the space over the applying rolls is divided by said guides. The guide 26 shown at the extreme right in Fig. 2 should be so located on the chute board as to prevent fruit discharged by the conveyor 12 from entering the space above the subadjacent roll 18 and to the right of said guide in Fig. 2.

The forward rolling movement imparted to the fruit by the chute board 13, or the slope of the applying roll runways, continues to advance the fruit down the runways and transversely of the travel of the cylindrical surfaces of the applying rolls. In this instance, the speed of the forward movement of the fruit is increased by the downward inclination of the cylindrical surfaces of the applying rolls toward the polisher rolls; although were the applying rolls disposed horizontally, the forward rolling movement imparted to the fruit by the chute board might be relied upon to project the fruit across the surfaces of the applying rolls, and such an arrangement of the latter is within the scope of my invention.

It is to be observed that the applying rolls all rotate in the same direction and that therefore all portions of the cylindrical surfaces of all of the applying rolls revolve in the same direction, but that the directions of engagement of the surfaces of any two adjacent rolls with the fruit supported therebetween are opposite. These opposite directions of engagement tend to rotate the fruit about an axis substantially transverse to the axis of their forward rolling movements, and to cause the fruit to climb out of each runway toward the crown of the next succeeding roll surface until the fruit comes into engagement with a guide 26, such engagement again shifting the direction of the rolling movement and directing such rolling movement back toward the runway. There is thus a constant shifting of the axis of rotation of the fruit in their rolling movements across the surfaces of the carrier or applying rolls, which presents different areas of the fruit to contact with the coating material upon those rolls. It is also to be observed that the articles of fruit in the runways are supported by the opposing cylindrical surfaces of the adjacent pair of applying rolls at points spaced apart circumferentially of the article, so that contact of the coating material occurs with the surface of the fruit simultaneously in areas spaced apart substantially in circumferential lines, and that finally every shifting of the axis of the article presents different areas of contact with the opposing surfaces of the adjacent applying rolls and with the coating material thereon, resulting in a rapid application of the coating material to a large part of or all of the surface of the fruit. With such initial distribution of the coating material over the surface of the fruit, a thin, uniform and smooth coating is then readily formed by the brushing or rubbing action of the brush or polisher rolls, when the fruit is delivered to the polisher runways in the manner heretofore stated.

To aid in turning the articles or pieces of fruit over and over in all directions as they traverse the elongated runways between adjacent brush rolls and thus assist in obtaining thorough and uniform distribution of the coating material thereover, means may advantageously be provided arranged to yieldingly engage the upper surfaces of the pieces of fruit frictionally as they travel along the brush rolls, and in the illustrative embodiment of the apparatus shown in Fig. 1, such means is provided in the form of a blanket 27 of any suitable material, such for example as a woven fabric, which is secured along the side edges of the frame 16 to extend over the rolls of the polisher.

What I claim is:

1. Coating apparatus comprising, in combination, composition-applying roll means, means for feeding the articles to be coated to said roll means and longitudinally thereof, and rubbing or brushing means comprising runway means adapted to receive articles from said roll means.

2. Coating apparatus comprising, in combination, inclined parallel driven brush rolls of the polisher type cooperating to provide elongated sloping runway means, composition-applying roll mechanism mounted adjacent to discharge articles into such runway means, and means arranged to feed articles to said applying roll mechanism.

3. Coating apparatus comprising, in combination, suitably driven revoluble brush roll mechanism of the polisher type, a supply reservoir, and suitably driven applying roll means arranged to dip into coating material contained in said reservoir and to supply said material by direct contact to articles delivered to said brush roll mechanism.

4. Coating apparatus comprising the combination with a rotating element presenting a cylindrical surface adapted to bear a coating material and means for supplying said coating material thereto, of means arranged to project articles to be coated across the path of travel of said cylindrical surface and in contact with said coating material thereon, and means comprising runway means arranged to receive articles so projected across said surface and operative to distribute adhering coating material thereover.

5. Coating apparatus for fruit or like articles comprising in combination, means for applying coating material including elements presenting surfaces adapted to receive a spread of the coating material and means for spreading said material thereon said elements being arranged to present said surfaces in juxtaposition to engage the articles to be coated at points spaced circumferentially thereof, means for projecting the articles to be coated in a rolling movement along said surfaces, said elements being movable to vary the axis of rotation of said articles in said rolling movement along said surfaces, means to move said elements, and means arranged to receive said articles from said surfaces and operative to distribute adhering coating material thereover.

6. Coating apparatus comprising in combination, a plurality of inclined parallel brush rolls of the polisher type cooperating in pairs to provide a plurality of elongated sloping runways, a plurality of parallel applying rolls cooperating in pairs to provide runways adjacent the upper ends of the first mentioned runways and in operative alinement therewith for delivery of articles thereinto, conveyor means arranged to feed articles to the applying roll runways, means for supplying said applying rolls with coating material, and driving means for said brush rolls, applying rolls and conveyor means.

7. Coating apparatus as set forth in claim 6, further characterized by provision of adjustable means for regulating the spread of coating material on said applying rolls.

8. Coating apparatus comprising, in combination, a plurality of inclined parallel brush rolls of the polisher type cooperating in pairs to provide a plurality of elongated sloping runways, a plurality of parallel applying rolls cooperating in pairs to provide runways adjacent the upper ends of the first mentioned runways and in operative alinement therewith for delivery of articles thereinto, conveyor means arranged to feed articles to the applying roll runways, guide means for maintaining articles in the applying roll runways, means for supplying said applying rolls with coating material, and driving means for said brush rolls, applying rolls and conveyor means.

9. In an apparatus for coating fruit or like articles, in combination, a container having a supply of a fluent coating material, a plurality of rotating applying devices arranged in a series in parallelism and all rotating in the same direction, each applying device having a cylindrical surface partially immersed in said fluent material and adapted to receive by adherence, quantities of said coating material, a presser roll for each of said applying devices yieldingly engaging the retreating side of each of said cylindrical surfaces above the liquid level of said fluent material and means for varying the pressure of said yielding engagement, said rotating applying devices being arranged to position said cylindrical surfaces in paths of travel above said liquid level in spaced relation providing runways for the articles to be coated across any two adjacent cylindrical surfaces and in contact with each, means to deliver the articles to be coated to said runway, and means arranged to receive said articles from said runway and operative to distribute adhering coating material thereover.

10. Coating apparatus comprising, in combination, composition-applying roll means, and rubbing or brushing means arranged to provide runway means receiving articles from said roll means.

11. Apparatus for coating globular articles comprising, in combination, rotary composition-applying means, and rubbing or brushing means adapted to support articles received from said rotary means.

12. Apparatus for coating globular articles comprising in combination, composition applying means supporting and rotating articles to be coated, and brush rolls of the polisher type cooperating to provide elongated runway means supporting articles received from said composition applying means.

In testimony whereof I hereunto affix my signature.

CHARLES MURDOCK JAMIESON.